United States Patent
Mei et al.

(10) Patent No.: US 12,173,115 B2
(45) Date of Patent: *Dec. 24, 2024

(54) MULTICOLORED ELECTROCHROMIC POLYMER COMPOSITIONS AND METHODS OF MAKING AND USING THE SAME

(71) Applicant: LannRay Advanced Materials Co., LTD, Ningbo (CN)

(72) Inventors: Jianguo Mei, West Lafayette, IN (US); Yan Zhou, Fremont, CA (US)

(73) Assignee: LannRay Advanced Materials Co., LTD, Ningbo (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,807

(22) Filed: Aug. 28, 2023

(65) Prior Publication Data
US 2023/0416452 A1    Dec. 28, 2023

Related U.S. Application Data

(63) Continuation of application No. 17/376,470, filed on Jul. 15, 2021, now Pat. No. 11,773,214, which is a continuation of application No. 16/718,674, filed on Dec. 18, 2019, now Pat. No. 11,066,513, which is a continuation of application No. 15/965,483, filed on Apr. 27, 2018, now Pat. No. 10,544,257, which is a continuation of application No. 15/399,839, filed on Jan. 6, 2017, now Pat. No. 9,975,989.

(60) Provisional application No. 62/331,760, filed on May 4, 2016.

(51) Int. Cl.
*C08G 61/12* (2006.01)
*C09K 9/02* (2006.01)

(52) U.S. Cl.
CPC ......... *C08G 61/126* (2013.01); *C08G 61/123* (2013.01); *C09K 9/02* (2013.01); *C08G 2261/124* (2013.01); *C08G 2261/1424* (2013.01); *C08G 2261/18* (2013.01); *C08G 2261/19* (2013.01); *C08G 2261/228* (2013.01); *C08G 2261/312* (2013.01); *C08G 2261/3246* (2013.01); *C08G 2261/3247* (2013.01); *C08G 2261/3327* (2013.01); *C08G 2261/364* (2013.01); *C08G 2261/419* (2013.01); *C08G 2261/54* (2013.01); *C09K 2211/1475* (2013.01); *C09K 2211/1483* (2013.01); *C09K 2211/1491* (2013.01)

(58) Field of Classification Search
CPC ........ C08G 76/06; C07D 495/04; C09K 9/02; C09K 211/1458; C09K 211/1466; B05D 5/06; B05D 5/12; B05D 1/04
See application file for complete search history.

(56) References Cited

U.S. PATENT DOCUMENTS

2011/0063709 A1    3/2011   Kanitz et al.
2011/0288253 A1    11/2011  Reynolds et al.
(Continued)

*Primary Examiner* — Shane Fang
(74) *Attorney, Agent, or Firm* — Sheppard Mullin Richter & Hampton LLP

(57) ABSTRACT

This disclosure relates generally to electrochromic polymers that include a plurality of π-conjugated chromophores in spaced relation with one another, and a plurality of conjugation-break spacers (CBSs), where at least one CBS separates adjacent chromophores. The chromophores may be colored in the neutral state, and multicolored to transmissive in different oxidization states.

11 Claims, 1 Drawing Sheet

(56) References Cited

U.S. PATENT DOCUMENTS

2016/0122476 A1    5/2016   Reynolds et al.
2017/0267811 A1    9/2017   Reynolds et al.

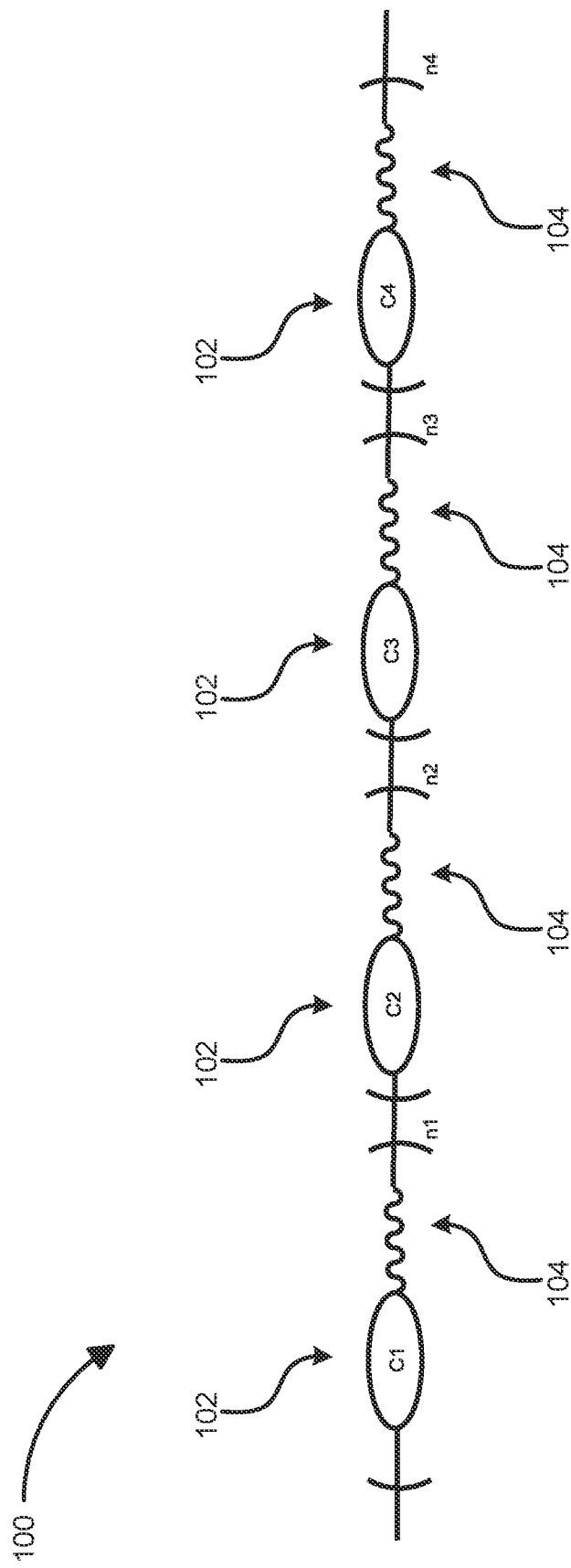
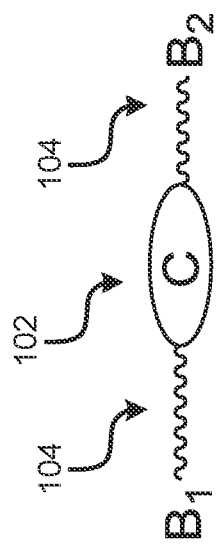
FIG. 1A
FIG. 1B

MULTICOLORED ELECTROCHROMIC POLYMER COMPOSITIONS AND METHODS OF MAKING AND USING THE SAME

CROSS-REFERENCE TO RELATED APPLICATIONS

This application is a continuation of U.S. patent application Ser. No. 17/376,470, filed on Jul. 15, 2021, which is a continuation of U.S. patent application Ser. No. 16/718,674, filed on Dec. 18, 2019, issued as U.S. Pat. No. 11,066,513, which is a continuation of U.S. patent application Ser. No. 15/965,483, filed on Apr. 27, 2018, issued as U.S. Pat. No. 10,544,257, which is a continuation application of U.S. patent application Ser. No. 15/399,839, filed on Jan. 6, 2017, issued as U.S. Pat. No. 9,975,989, which claims priority to U.S. Provisional Application No. 62/331,760, filed on May 4, 2016, titled "Multicolored Electrochromic Polymer Compositions and Methods of Making and Using the Same." The entire contents of the above-referenced applications are incorporated herein by reference.

FIELD OF THE INVENTION

The disclosure relates generally to multicolored electrochromic polymers, and methods of making and using the same.

BACKGROUND

Electrochromism generally refers to the reversible change in the optical properties of a material upon application of a potential. In particular, electrochromic materials exhibit a reversible color change due to an electrochemical reduction-oxidation (redox) reaction caused by application of an electric field.

Conductive, conjugated polymers have become a useful class of electrochromic materials in a variety of applications, including photovoltaic devices, field effect transistors, organic light emitting diodes, general printed electronics, anti-glare window and display systems, etc. Conjugated polymers have garnered interest due to the ability to tune the optical and electronic properties thereof.

However, a need exists to develop new and/or improved polymeric materials with specific optical and electronic properties, lower bandgaps, improved color retention, etc. Likewise, there is also a need to develop new and/or improved methods of making said polymeric materials that involve cost effective, efficient processes with high batch reproducibility.

BRIEF SUMMARY

The present disclosure is directed to an electrochromic polymer. In one embodiment, the electrochromic polymer includes a plurality of π-conjugated chromophores in spaced relation with one another, where each chromophore is colored in a neutral state, and is colored or transmissive in an oxidized state. The electrochromic polymer also includes a plurality of conjugation-break spacers (CBSs), where at least one CBS separates adjacent chromophores.

The present disclosure is also directed to a method for preparing at least a portion of an electrochromic polymer. In one embodiment, the method for preparing at least a portion of an electrochromic polymer includes: combining three or more monomer units in a solvent, wherein the monomer units have complementary reactive functional groups; optionally adding a catalyst to the solvent; and cross-coupling the monomer units to yield a π-conjugated copolymer sequence.

Other objects, features and advantages of the described preferred embodiments will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Preferred and non-limiting embodiments of the invention may be more readily understood by referring to the accompanying drawings in which:

FIG. 1A is a simplified schematic of an electrochromic polymer having a plurality of chromophores separated by at least one conjugation-break spacer (CBS), according to one exemplary embodiment.

FIG. 1B is an exploded view of a single chromophore positioned between two CBSs, according to one exemplary embodiment.

DETAILED DESCRIPTION OF THE PREFERRED EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Numeric ranges are also inclusive of the numbers defining the range. Additionally, the singular forms "a", "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Unless defined otherwise, all technical and scientific terms used herein have the same meaning as is commonly understood by one of skill in the art to which this invention belongs. For instance, "amino" refers to the —$NH_2$ radical; "hydroxy" or "hydroxyl" refers to the OH radical; "thioxo" refers to the =S substituent, etc.

"Alkyl" refers to a straight or branched hydrocarbon chain radical consisting solely of carbon (C) and hydrogen (H) atoms, which is saturated or unsaturated (i.e., contains one or more double and/or triple bonds), having from 1 to 30 carbon atoms ($C_1$-$C_{30}$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group may be optionally substituted.

"Alkylene" or "alkylene chain" refers to a straight or branched divalent hydrocarbon chain linking the rest of the molecule to a radical group, consisting solely of carbon and hydrogen, which is saturated or unsaturated (i.e., contains one or more double and/or triple bonds), and having from 2 to 30 carbon atoms ($C_2$-$C_{30}$ alkylene), e.g., methylene, ethylene, propylene, n-butylene, ethenylene, propenylene, n-butenylene, propynylene, n-butynylene, and the like. The alkylene chain is attached to the rest of the molecule through a single or double bond and to the radical group through a single or double bond. The points of attachment of the alkylene chain to the rest of the molecule and to the radical group can be through one carbon or any two carbons within the chain. Unless stated otherwise specifically in the specification, an alkylene chain may be optionally substituted.

"Alkylcarbonyl" refers to a radical of the formula —C(=O)$R_a$ where $R_a$ is a $C_1$-$C_{30}$ alkyl radical as defined above. Unless stated otherwise specifically in the specification, an alkylcarbonyl group may be optionally substituted.

"Alkoxy" refers to a radical of the formula —O$R_a$ where $R_a$ is a $C_1$-$C_{30}$ alkyl radical as defined above. A "haloalkoxy" is an alkoxy group as defined above, wherein at least one carbon-hydrogen bond is replaced with a carbon-halogen bond. Unless stated otherwise specifically in the specification, an alkoxy or haloalkoxy group may be optionally substituted.

"Alkoxyalkyl" refers to a radical of the formula —$R_b$O$R_a$ where $R_a$ is a $C_1$-$C_{30}$ alkyl radical as defined above, and $R_b$ is a $C_2$-$C_{30}$ alkylene radical as defined above. A "haloalkoxyalkyl" group is an alkoxyalkyl, wherein at least one carbon-hydrogen bond is replaced with a carbon-halogen bond. Unless stated otherwise specifically in the specification, an alkoxyalkyl or haloalkoxyalkyl group may be optionally substituted.

"Alkoxycarbonyl" refers to a radical of the formula —C(=O)O$R_a$ where $R_a$ is a $C_1$-$C_{30}$ alkyl radical as defined above. Unless stated otherwise specifically in the specification, an alkoxycarbonyl group may be optionally substituted.

"Alkoxycarbonylalkyl" refers to a radical of the formula —$R_b$(C=O)O$R_a$ where $R_a$ is a $C_1$-$C_{30}$ alkyl radical as defined above, and $R_b$ is a $C_2$-$C_{30}$ alkylene as defined above. Unless stated otherwise specifically in the specification, an alkoxycarbonylalkyl group may be optionally substituted.

"Aminylcarbonyl" refers to a radical of the formula —C(=O)N($R_a$)$_2$, where each $R_a$ is independently H or a $C_1$-$C_{30}$ alkyl group as defined above. Unless stated otherwise specifically in the specification, an aminylcarbonyl group may be optionally substituted.

"Aminylalkyl" refers to a radical of the formula —$R_a$N($R_b$)$_2$ where $R_a$ is a $C_2$-$C_{30}$ alkylene as defined above, and each $R_b$ is independently a $C_1$-$C_{30}$ alkyl radical as defined above. Unless stated otherwise specifically in the specification, an aminylalky group may be optionally substituted.

"Alkylaminyl" refers to a radical of the formula —NH$R_a$ or —N$R_a$$R_a$ where each $R_a$ is independently a $C_1$-$C_{30}$ alkyl radical as defined above, and $R_a$ is a $C_1$-$C_{30}$ alky radical as defined above. Unless stated otherwise specifically in the specification, an aminylalky group may be optionally substituted.

"Alkylsulfonyl" refers to a radical of the formula —S(O)$_2$$R_a$ where $R_a$ is a $C_1$-$C_{30}$ alkyl radical as defined above. Unless stated otherwise specifically in the specification, an alkylsulfonyl group may be optionally substituted.

"Alkylsulfonylalkyl" refers to a radical of the formula —$R_b$S(O)$_2$$R_a$ where $R_a$ is a $C_1$-$C_{30}$ alkyl radical as defined above, and $R_b$ is a $C_2$-$C_{30}$ alkylene radical as defined above. Unless stated otherwise specifically in the specification, an alkylsulfonylalkyl group may be optionally substituted.

"Cyanoalkyl" is a $C_1$-$C_{30}$ alkyl group as defined above, wherein at least one carbon-hydrogen bond is replaced with a carbon-cyano bond. Unless stated otherwise specifically in the specification, a cyanoalkyl group may be optionally substituted.

"Hydroxylalkyl" refers to a $C_1$-$C_{30}$ alkyl radical as defined above, which has been substituted by one or more hydroxyl groups. Unless stated otherwise specifically in the specification, a hydroxylalkyl group may be optionally substituted.

"Aryl" refers to a hydrocarbon ring system radical comprising hydrogen, 6 to 18 carbon atoms and at least one aromatic ring. For purposes of this invention, the aryl radical may be a monocyclic, bicyclic, tricyclic or tetracyclic ring system, which may include fused or bridged ring systems. Aryl radicals include, but are not limited to, aryl radicals derived from phenyl, naphthyl, anthryl, etc. Unless stated otherwise specifically in the specification, the term "aryl" is meant to include aryl radicals that are optionally substituted.

"Conjugated polymer" refers to a polymer having alternating single and double (or triple) carbon-carbon bonds along at least a portion of the polymer backbone.

"Cycloalkyl" or "carbocyclic ring" refers to a stable non-aromatic monocyclic or polycyclic hydrocarbon radical consisting solely of carbon and hydrogen atoms, which may include fused or bridged ring systems, having from 3 to 15 carbon atoms, and which is saturated or unsaturated and attached to the rest of the molecule by a single bond. Monocyclic radicals may include, but are not limited to, cyclopropyl, cyclobutyl, cyclopentyl, cyclohexyl, cycloheptyl, and cyclooctyl. Polycyclic radicals may include, but are not limited to, adamantyl, norbornyl, decalinyl, 7,7-dimethyl-bicyclo[2.2.1]heptanyl, and the like. Unless otherwise stated specifically in the specification, a cycloalkyl group may be optionally substituted.

"Cycloalkylaminyl" refers to a radical of the formula —N$R_a$$R_c$ where $R_a$ is, independently, H or a $C_1$-$C_{30}$ alkyl radical as defined above, and $R_c$ is a $C_3$-$C_{15}$ cycloalkyl radical as defined above. Unless stated otherwise specifically in the specification, an aminylalky group may be optionally substituted.

"Cycloalkylalkylaminyl" refers to a radical of the formula —N$R_a$$R_b$—$R_c$ where $R_a$ is independently H or a $C_1$-$C_{30}$ alkyl radical as defined above, $R_b$ is a $C_2$-$C_{30}$ alkylene radical as defined above, and $R_c$ is a $C_3$-$C_{15}$ cycloalkyl radical as defined above. Unless stated otherwise specifically in the specification, a cycloalkylalkylaminyl group may be optionally substituted.

"Cycloalkylalkyl" refers to a radical of the formula —$R_b$$R_c$ where $R_b$ is a $C_2$-$C_{30}$ alkylene chain as defined above, and $R_c$ is a $C_3$-$C_{15}$ cycloalkyl radical as defined above. Unless-stated otherwise specifically in the specification, a cycloalkylalkyl group may be optionally substituted.

"Cycloalkylalkyloxy" refers to a radical of the formula —$OR_bR_c$ where $R_b$ is a $C_2$-$C_{30}$ alkylene chain as defined above, and $R_c$ is a $C_3$-$C_{15}$ cycloalkyl radical as defined above. Unless stated otherwise specifically in the specification, a cycloalkylalkyloxy group may be optionally substituted.

"Fused" refers to any ring structure described herein which is fused to an existing ring structure in the compounds of the invention. When the fused ring is a heterocyclyl ring or a heteroaryl ring, any carbon atom on the existing ring structure which becomes part of the fused heterocyclyl ring or the fused heteroaryl ring may be replaced with a nitrogen atom.

"Halo" or "halogen" refers to bromo, chloro, fluoro or iodo.

"Haloalkyl" refers to a $C_1$-$C_{30}$ alkyl radical as defined above, that is substituted by one or more halo radicals as defined above, e.g., trifluoromethyl, difluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group may be optionally substituted.

"Heterocyclyl" or "heterocyclic ring" refers to a stable 3- to 18-membered non-aromatic ring radical which consists of 2 to 12 carbon atoms and from 1 to 6 heteroatoms selected from the group consisting of nitrogen, oxygen and sulfur. Unless stated otherwise specifically in the specification, the heterocyclyl radical may be a monocyclic, bicyclic, tricyclic or tetracyclic ring system, which may include fused or bridged ring systems; and the nitrogen, carbon or sulfur atoms in the heterocyclyl radical may be optionally oxidized; the nitrogen atom may be optionally quaternized; and the heterocyclyl radical may be partially or fully saturated. Examples of such heterocyclyl radicals may include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, Unless stated otherwise specifically in the specification, a heterocyclyl group may be optionally substituted.

"Heterocyclyloxy" refers to a radical of the formula —$OR_d$, wherein $R_d$ is a $C_1$-$C_{12}$ heterocyclyl radical as defined above. Unless stated otherwise specifically in the specification, a heterocyclyloxy group may be optionally substituted.

"Heterocyclylalkyloxy" refers to a radical of the formula —$OR_bR_d$ where $R_b$ is a $C_2$-$C_{30}$ alkylene chain as defined above, and $R_d$ is a $C_1$-$C_{12}$ heterocyclyl radical as defined above. Unless stated otherwise specifically in the specification, a heterocyclylalkyloxy group may be optionally substituted.

"Heterocyclylaminyl" refers to a radical of the formula —$N(R_a)_2R_d$ where $R_a$ is independently H or a $C_1$-$C_{30}$ alkyl radical as defined above, and $R_d$ is a $C_1$-$C_{12}$ heterocyclyl radical as defined above. Unless stated otherwise specifically in the specification, a heterocyclylaminyl group may be optionally substituted.

"Heterocyclylalkylaminyl" refers to a radical of the formula —$NR_aR_b$—$R_d$ where $R_a$ is H or a $C_1$-$C_{30}$ alkyl radical as defined above, $R_b$ is a $C_2$-$C_{30}$ alkylene radical as defined above, and $R_d$ is a $C_1$-$C_{12}$ heterocyclyl radical as defined above. Unless stated otherwise specifically in the specification, a cycloalkylalkylaminyl group may be optionally substituted.

"Heterocyclylcarbonyl" refers to a radical of the formula —$C(=O)R_d$ where $R_d$ is a $C_1$-$C_{12}$ heterocyclyl radical as defined above. Unless stated otherwise specifically in the specification, a heterocyclycarbonyl group may be optionally substituted.

"Heterocyclylalkyl" refers to a radical of the formula —$R_bR_d$ where $R_b$ is a $C_2$-$C_{30}$ alkylene chain as defined above, and $R_d$ is a $C_1$-$C_{12}$ heterocyclyl radical as defined above. Unless stated otherwise specifically in the specification, a heterocyclylalkyl group may be optionally substituted.

"Heteroaryl" refers to a 5 to 14 membered ring system radical comprising hydrogen atoms, 1 to 13 carbon atoms, 1 to 6 heteroatoms selected from the group consisting of nitrogen, oxygen and sulfur, and at least one aromatic ring. For purposes of this invention, the heteroaryl radical may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e. thienyl). Unless stated otherwise specifically in the specification, a heteroaryl group may be optionally substituted.

"Heteroarylalkyl" refers to a radical of the formula —$R_bR_e$ where $R_b$ is a $C_2$-$C_{30}$ alkylene chain as defined above, and $R_e$ is a $C_1$-$C_{13}$ heteroaryl radical as defined above. Unless stated otherwise specifically in the specification, a heteroarylalkyl group may be optionally substituted.

The term "substituted" used herein means any of the above groups (e.g., alkyl, alkylene, alkylcarbonyl, alkoxy, alkoxyalkyl, haloalkoxyalkyl, alkoxycarbonyl, alkoxycarbonylalkyl, aminylcarbonyl, aminylalkyl, alkylaminyl, alkylsulfonyl, alkylsulfonylalkyl, cyanoalkyl, hydroxylalkyl, aryl, cycloalkyl, cycloalkylalkyl, cycloalkyloxy, cycloalkylaminyl, cycloalkylalkylaminyl, cycloalkylalkyloxy, haloalkyl, heterocyclyl, heterocyclyloxy, heterocyclylalkyloxy, heterocyclylaminyl, heterocyclylalkylaminyl, heterocyclylcarbonyl, heterocyclylalkyl, heteroaryl and/or heteroarylalkyl) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —$NR_gR_h$, —$NR_gC(=O)R_h$, —$NR_gC(=O)NR_gR_h$, —$NR_gC(=O)OR_h$, —$NR_gSO_2R_h$, —$OC(=O)NR_gR_h$, —$OR_g$, —$SR_g$, —$SOR_g$, —$SO_2R_g$, —$OSO_2R_g$, —$SO_2OR_g$, =$NSO_2R_g$, and —$SO_2NR_gR_h$. "Substituted" also means any of the above groups in which one or more hydrogen atoms are replaced with —$C(=O)R_g$, —$C(=O)OR_g$, —$C(=O)NR_gR_h$, —$CH_2SO_2R_g$, —$CH_2SO_2NR_gR_h$. In the foregoing, $R_g$ and $R_h$ are the same or different and independently hydrogen, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, alkylaminyl, cyano, hydroxyl, imino, nitro, oxo, thioxo, halo, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl group. In addition, each of the foregoing substituents may also be optionally substituted with one or more of the above substituents.

"Optional" or "optionally" means that the subsequently described event of circumstances may or may not occur, and that the description includes instances where said event or circumstance occurs and instances in which it does not. For example, "optionally substituted aryl" means that the aryl radical may or may not be substituted and that the description includes both substituted aryl radicals and aryl radicals having no substitution.

Embodiments disclosed herein are directed to novel semiconducting electrochromic polymers that exhibit high optical contrasts in the visible region, as well as possess switching speeds and/or stability often superior to current electrochromic polymers (ECPs). The novel semiconducting electrochromic polymers may include a plurality of π-conjugated chromophores, one or more of which may be colored in the neutral state and colored or transmissive in an oxidized state, and a plurality of conjugation-break spacers (CBS), where at least one CBS separates adjacent chromophores. Such semiconducting electrochromic polymers may be melt-processable, with the melting temperatures used in such processes being controlled by the ratio of CBSs with selected chromophores. These multicolored electrochromic polymers may thus be particularly advantageous for organic electronic devices due to their superior and/or improved processability, optoelectronic properties, and mechanical properties.

Referring now to FIG. 1A, a simplified schematic of an electrochromic polymer 100 is shown according to an exemplary embodiment. The electrochromic polymer 100 of FIG. 1A may be implemented in combination with other devices/features/components described herein, such as those described with reference to other embodiments and/or FIGS.

The electrochromic polymer 100 may also be used in various applications and/or in permutations, which may or may not be noted in the illustrative embodiments/aspects described herein. For instance, the electrochromic polymer 100 may include more or less features/components than those shown in FIG. 1A, in certain embodiments.

As shown in FIG. 1A, the electrochromic polymer 100 includes a plurality of π-conjugated chromophores 102 in spaced relation with one another. Adjacent chromophores are separated from one another by at least one conjugation-break spacer (CBS) 104. Accordingly, the electrochromic polymer 100 has the structure:

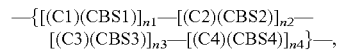

where C1, C2, C3, and C4 represent the π-conjugated chromophores 104; CBS1, CBS2, CBS3, and CBS4 represent the non-conjugated, flexible spacers 104; and each of n1, n2, n3, and n4 is independently an integer in a range from 1 to 50.

In certain embodiments, each chromophore 102 may independently include a random or alternating copolymer sequence. For instance, each chromophore 102 may independently include at least two discernable monomer units that are randomly distributed to yield a random copolymer sequence, or distributed in a regular alternating fashion to yield an alternating copolymer sequence.

In certain embodiments, the aforementioned monomer units may each include a single aromatic ring, a single heteroaromatic ring, a plurality of fused aromatic rings, and/or a plurality of fused heteroaromatic rings. For instance, in one embodiment, at least one of the monomer units may include a thiophene unit or a substituted thiophene unit, such as 3,4-propylenedioxythiophene substituted on the propylene bridge, or any derivative and/or equivalent analog thereof. In another embodiment, at least another of the monomer units may include a monocyclic or fused polycyclic aromatic unit, such as benzene, substituted benzene, benzo[c][1,2,5]thiadiazole, substituted benzo[c][1,2,5]thiadiazole, or any derivative and/or equivalent analog thereof.

In certain embodiments, at least one of the monomer units may include one or more substituents (e.g., functional groups, side chains, etc.) configured to provide sufficient solubility, desired electronic properties, and/or desired steric and molecular stacking properties. Solubilizing substituents may include linear or branched alkyl groups, which may improve polymer solubility in organic solvents. Solubilizing substituents may also include polar or ionic groups (e.g., ether, ester, amide, sulfonate, carboxylate, phosphonate, amine functionalized chains, etc.), which may improve polymer solubility in aqueous solvents. The inclusion of suitable polar or ionic substituents in at least one of the monomer units may also facilitate the copolymer's ability to adhere to surfaces, e.g., metallic surfaces. In certain embodiments, at least one of the monomer units may include one or more substituents configured to facilitate the processing of the copolymer into a film, and the optional conversion of the copolymer into a different copolymer (e.g., conversion from a soluble film to an insoluble film).

In certain embodiments, at least one chromophore 102 may include a conjugated copolymer sequence having the structure (I):

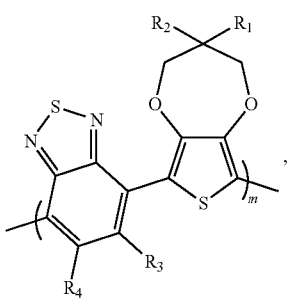

(I)

where m is an integer greater than 0 (e.g., an integer in a range from 1 to 50), and each of $R_1$, $R_2$, $R_3$ and $R_4$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

In certain embodiments, at least one chromophore 102 may include a conjugated copolymer sequence having the structure (II):

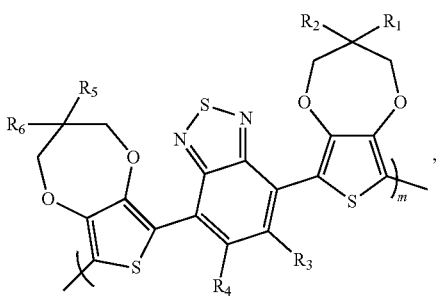

(II)

where m is an integer greater than 0 (e.g., an integer in a range from 1 to 50), and each of $R_1$, $R_2$, $R_3$ $R_4$, $R_5$ and $R_6$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

In certain embodiments, at least one chromophore 102 may include a conjugated copolymer sequence having the structure (III):

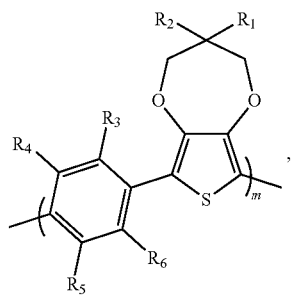

(III)

where m is an integer greater than 0 (e.g., an integer in a range from 1 to 50), and each of $R_1$, $R_2$, $R_3$ $R_4$, $R_5$ and $R_6$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

As noted above, the integer m in structures (I), (II), and/or (III) may range from 1 to 50 in certain embodiments. In one embodiment, the integer m in structures (I), (II), and/or (III) may range from 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

In certain embodiments, each of the chromophores 102 of the electrochromic polymer 100 may independently include a conjugated copolymer sequence having structure (I), structure (II), structure (III), or combinations thereof. For instance, in one embodiment, each of the chromophores 102 may include a conjugated copolymer sequence having structure (I). In another embodiment, each of the chromophores 102 may include a conjugated copolymer sequence having structure (II). In yet another embodiment, each of the chromophores 102 may include a conjugated copolymer sequence having structure (III). In still another embodiment, each of the chromophores 102 may include a conjugated copolymer sequence resulting from a combination of structures (I) and (II), a combination of structures (I) and (III), a combination of structures (II) and (III), or a combination of structures (I), (II) and (III).

In certain embodiments, at least two chromophores 102 may include conjugated copolymer sequences having different structures relative to one another. For instance, in one embodiment, at least one of the chromophores 102 may include a conjugated copolymer sequence having structure (I), whereas at least another of the chromophores 102 may include a conjugated sequence having structure (II) or (III). Likewise, in one embodiment, at least one of the chromophores 102 may include a conjugated copolymer sequence having structure (II), whereas at least another of the chromophores 102 may include a conjugated sequence having structure (III). In another embodiment, at least one of the chromophores 102 may include a conjugated copolymer sequence having structure (I), at least one of the chromophores 102 may include a conjugated sequence having structure (II), and at least one of the chromophores 102 may include a conjugated sequence having structure (III).

In certain embodiments, each of the chromophores 102 may be colored (e.g., red, green, blue, or other color) in the neutral state. The desired color of each chromophore 102 may be achieved, in various embodiments, by varying the conjugated copolymer sequence thereof.

In one embodiment, one or more of the chromophores 102 may be a different color relative to one another in a neutral state. In one embodiment, at least two (e.g., two, three, four, five, six, seven, eight, etc.) of the chromophores 102 may be a different color relative to one another in a neutral state. In one embodiment, at least a majority or substantially all (e.g., at least 80%, 85%, 90%, 95% or 99%) of the chromophores 102 may be a different color relative to one another in a neutral state. In one embodiment, each the chromophores 102 may be a different color relative to one another in a neutral state.

In another embodiment, at least two of the chromophores 102 may have the same color as one another in a neutral state. In one embodiment, at least a majority or substantially all of the chromophores 102 may have the same color as one another in a neutral state. In one embodiment, each of the chromophores 102 may have the same color as one another in a neutral state.

In certain embodiments, each of the chromophores 102 may be colored or transmissive in an oxidation state. In one embodiment, at least one of the chromophores 102 may be transmissive in an oxidation state. In one embodiment, at least a majority or substantially all of the chromophores 102 may be transmissive in an oxidation state. In one embodiment, each of the chromophores 102 may be transmissive in an oxidation state.

In another embodiment, at least one of the chromophores 102 may be colored in an oxidation state. In one embodiment, at least a majority or substantially all of the chromophores 102 may be colored in an oxidation state. In one embodiment, each of the chromophores 102 may be colored in an oxidation state.

In yet another embodiment, at least one of the chromophores 102 may be transmissive in an oxidation state, and at least another of the chromophores 102 may be colored in an oxidation state.

In certain embodiments, at least one chromophore 102 may have several stable oxidation states of different colors. In one embodiment, at least a majority or substantially all of the chromophores 102 may have several stable oxidation states of different colors. In one embodiment, each of the chromophores 102 may have several stable oxidation states of different colors.

In certain embodiments, at least two, at least a majority, substantially all, or all of the chromophores 102 in the electrochromic polymer 100 may have one or more of the following: the same structure, the same optoelectronic properties (e.g., exhibit the same color in the neutral state, exhibit the same color(s) or be transmissive in the redox state(s), etc.), the same density, the same processibility, the same solubility, the same flexibility, and the same mechanical properties as one another.

In certain embodiments, at least two, at least a majority, substantially all, or all of the chromophores 102 in the electrochromic polymer 100 may have one or more of the following: different compositions, different optoelectronic properties (e.g., exhibit different colors in the neutral state, exhibit different colors or be transmissive in the oxidized state(s), etc.), different densities, different processibility, different solubility, different flexibility, and different mechanical properties as one another.

In certain embodiments, the conjugated copolymer sequences of the chromophores 102 may be prepared by step-growth, condensation reactions between monomers comprising complementary reactive groups. Skilled artisans may readily appreciate the complementary reactive groups for the monomers which are suitable to achieve polymerization via condensation reactions or other known polymerization reactions. Such condensation reactions may occur in an appropriate solvent, and be optionally catalyzed by a palladium or other metallic catalyst. Suitable condensation reactions may include Suzuki coupling, Kuamda coupling, Negishi coupling, Stille coupling, etc.

As discussed previously, at least one CBS 104 (designated by the symbol-⁓⁓⁓ in FIG. 1A) separates adjacent chromophores 102. Each of the CBSs 104 may be flexible, and non-conjugated. The presence of the CBSs 104 in the electrochromic polymer 100 may serve to confine the conjugation of the chromophores 100 into a well-defined chain length. Moreover, the electrochromic polymer 100 may also be melt-processable, with the ratio of the CBSs with selected chromophores controlling the melting temperatures. The ratio of the CBSs with selected chromophores may, in some embodiments, depend on the CBS and/or the chromophore length.

An exploded view of a single chromophore 102 having a CBS 104 on either side thereof is shown in FIG. 1B. In certain embodiments, the CBS 104 on either side of the chromophore 102 may be the same as one another (e.g., have the same structure). In certain embodiments, the CBS the CBS 104 on either side of the chromophore 102 may different from one another (e.g., have different structures). In certain embodiments, the CBS 104 on one or both sides of the chromophore may have one of the following structures (IV), (V), (VI), (VII), or (VIII):

(IV)

(V)

(VI)

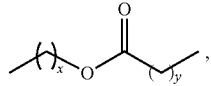

-continued

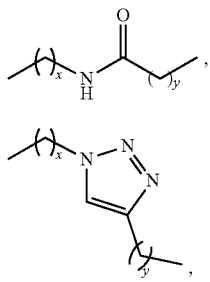

(VII)

or (VIII)

or combinations thereof, where each of x, y, and z is independently an integer in a range from 1 to 12, 2 to 12, 4 to 12, 6 to 12, 8 to 12, 10 to 12, 1 to 10, 2 to 10, 4 to 10, 6 to 10, 8 to 10, 1 to 8, 2 to 8, 4 to 8, 6 to 8, 1 to 6, 2 to 6, 4 to 6, 1 to 4, or 2 to 4.

In certain embodiments, the CBS 104 may have terminal functional groups (designated $B_1$ and $B_2$ in FIG. 1B), each of which may independently include, but is not limited to, OH, $NH_2$, COOH, phenol, alkene, and the like.

EXAMPLES

As noted above, the conjugated copolymer sequences of the chromophores disclosed herein may be prepared by step-growth, condensation reactions between monomers comprising complementary reactive groups. For instance, in certain embodiments, a conjugated copolymer sequence may be prepared by: (i) combining, in one or more suitable solvents, at least three monomer units (e.g., M1, M2, M3), where the monomer units have complementary reactive groups; (ii) optionally adding a catalyst (e.g., a palladium compound) to the solvent; and (iii) cross-coupling the monomer units to produce a conjugated copolymer sequence in which the monomer units are distributed in a random fashion or a regular alternating fashion.

In certain embodiments, one of the monomer units (e.g., M1) may include: 1,4-dibromobenzene, substituted 1,4-dibromobenzene, 4,7-dibromobenzo[c][1,2,5]thiadiazole, or substituted 4,7-dibromobenzo[c][1,2,5]thiadiazole. For instance, the structure of the M1 monomer unit may be selected from the following structures (IX) or (X):

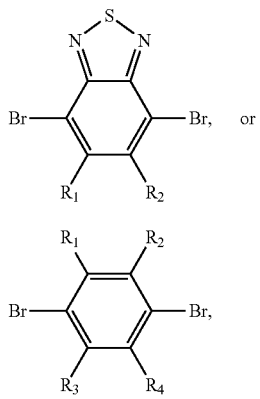

where each of $R_1$, $R_2$, $R_3$ and $R_4$ is independently selected from hdyrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as would be appreciated by skilled artisans upon reading the present disclosure.

In certain embodiments, the structure of at least another of the monomer units (e.g., M2 and/or M3) may include: 3,4-propylenedioxythiophene, a substituted 3,4-propylenedioxythiophene, or derivatives and/or combinations thereof. For instance, the structure of the M2 and/or M3 monomer units may be selected from the following structures (XI), (XII) or (XIII):

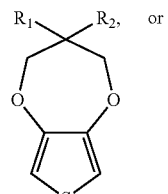

(XI)

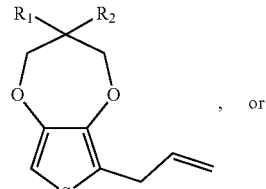

(XII)

, or

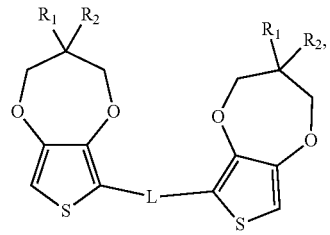

(XIII)

where each of $R_1$ and $R_2$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as would be appreciated by skilled artisans upon reading the present disclosure; and L is a linking segment. The linking segment, L, may include:

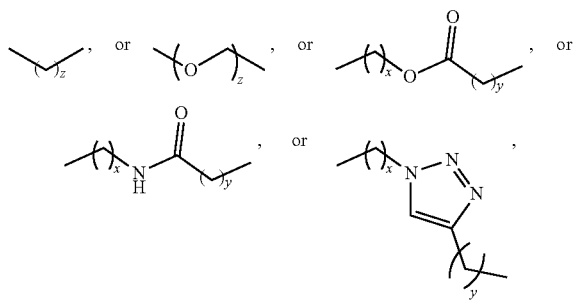

or combinations thereof, where each of x, y, and z is independently an integer greater than 0. In some embodiments, each of x, y, and z is independently an integer in a range from 1 to 12. Other suitable linking segments may also be used as would be appreciated by skilled artisans upon reading the present disclosure.

Examples 1-6 describe reaction schemes for the preparation of conjugated copolymer sequences in accordance with the general polymerization method discussed above. In contrast to conventional electrochromic polymers, the novel electrochromic polymers disclosed herein, such as those described with reference to FIGS. 1A-1B and Examples 1-6, demonstrate enhanced solution processability, can be melt processed, and exhibit multi-color transitions upon oxidation or reduction before they are fully oxidized and become transmissive.

Example 1: Preparation of a Conjugated Copolymer Sequence of Structure (XXI)

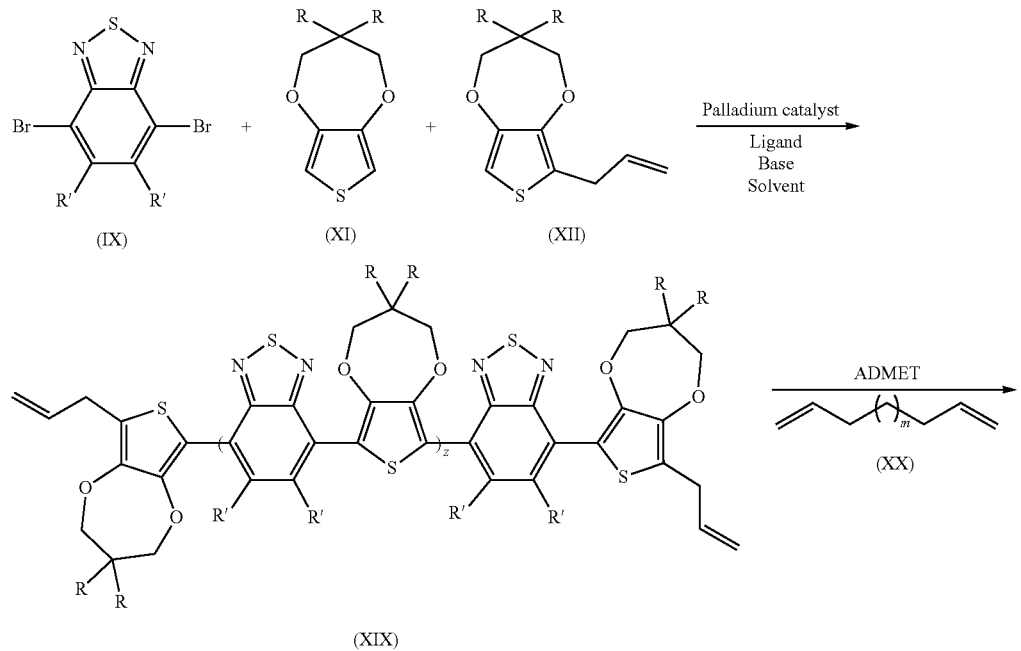

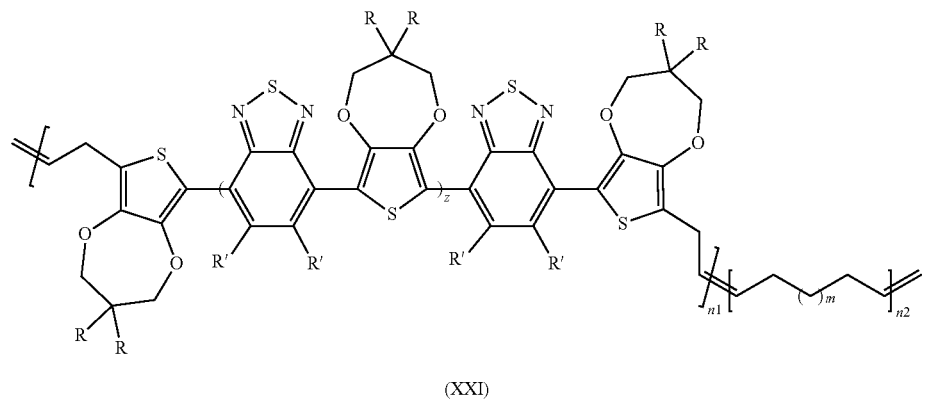

Monomer units having general structures (IX), (XI) and (XII) are combined in a suitable solvent in the presence of a palladium catalyst to form a terminal alkene of structure (XIX). Terminal alkene (XIX) is cross-coupled with a second terminal alkene having structure (XX) via an acyclic diene metathesis (ADMET) reaction to form the conjugated copolymer sequence having structure (XXI).

Each R and R' in the compounds above independently corresponds to a functional group as disclosed herein. In one embodiment, each R and R' is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer m, z, n1 and n2 in the compounds above is greater than zero. In one embodiment, integers m, z, n1, and n2 each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

Example 2: Preparation of a Conjugated Copolymer Sequence of Structure (XXIII)

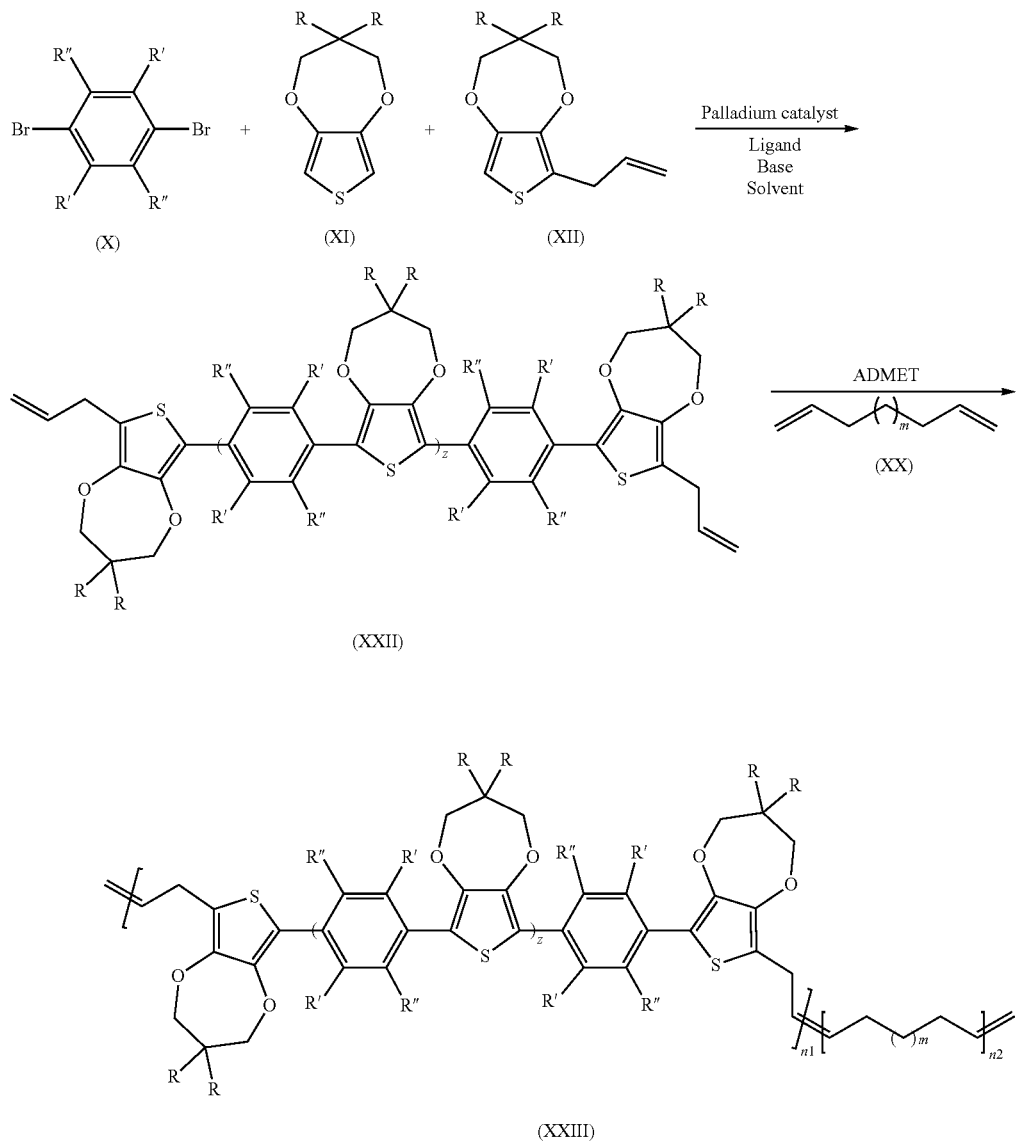

Monomer units having general structures (X), (XI) and (XII) are combined in a suitable solvent in the presence of a palladium catalyst to form a terminal alkene of structure (XXII). Terminal alkene (XXII) is cross-coupled with a second terminal alkene having structure (XX) via an acyclic diene metathesis (ADMET) reaction to form the conjugated copolymer sequence having structure (XXIII).

Each R, R', R" in the compounds above independently corresponds to a functional group as disclosed herein. In one embodiment, each R, R' and R" is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer m, z, n1 and n2 in the compounds above is greater than zero. In one embodiment, integers m, z, n1, and n2 each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

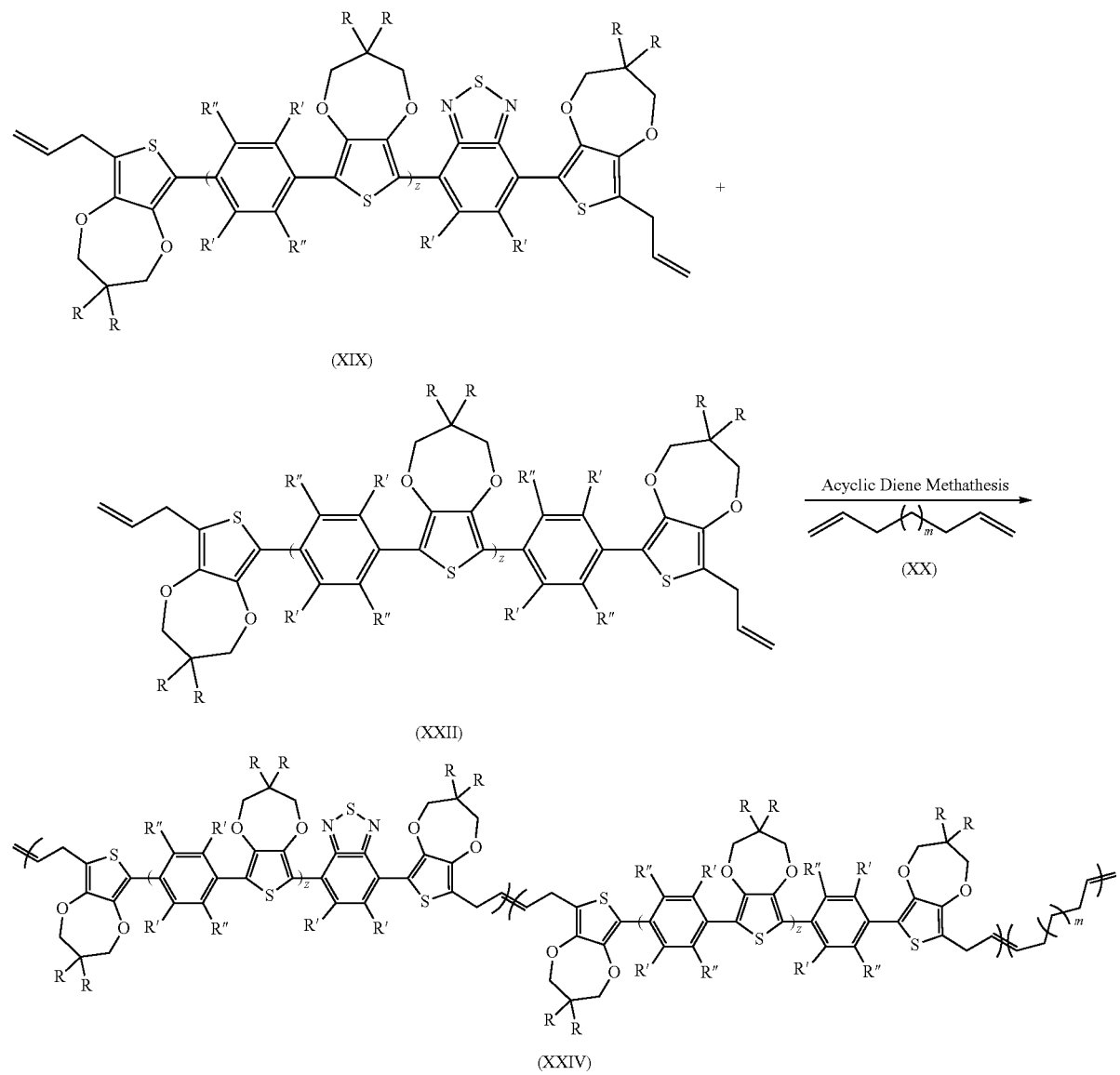

Example 3: Preparation of a Conjugated Copolymer Sequence of Structure (XXIV)

Terminal alkenes having structures (XIX), (XXII) and (XX) are cross-coupled via an acyclic diene metathesis (ADMET) reaction to form the conjugated copolymer sequence having structure (XXIV).

Each R, R', R" in the compounds above independently corresponds to a functional group as disclosed herein. In one embodiment, each R, R' and R" is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer m and z in the compounds above is greater than zero. In one embodiment, integers m and z each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

Example 4: Preparation of a Conjugated Copolymer Sequence of Structure (XXV)

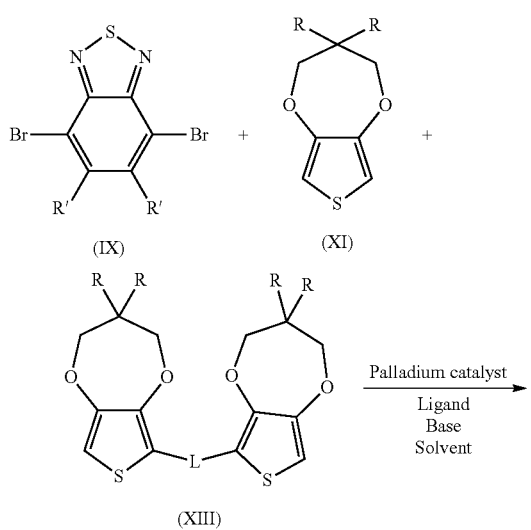

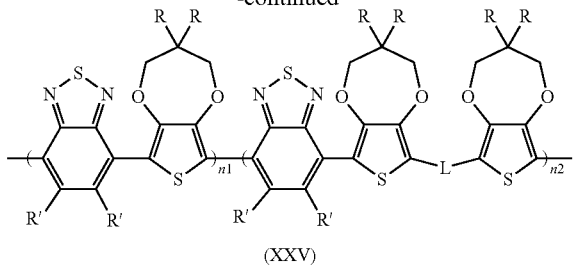

Monomer units having general structures (IX), (XI) and (XIII) are combined in a suitable solvent in the presence of a palladium catalyst to form a conjugated copolymer sequence having structure (XXV).

Each R and R' in the compounds above independently corresponds to a functional group as disclosed herein. In one embodiment, each R and R' is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$-alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer n1 and n2 in the compounds above is greater than zero. In one embodiment, integers n1 and n2 each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

A further exemplary, non-limiting embodiment describing the preparation of a conjugated copolymer sequence having structure (XXV) is as follows. A Schlenk flask (flask I) charged with $Pd(OAc)_2$ (about 0.02 eq), $K_2CO_3$ (about 2.6 eq), structure IX (about 1 eq) and PivOH (about 0.3 eq) was evacuated under vacuum for about 10 minutes and then purged with nitrogen. This process was repeated 3 times. To a separate flask (flask II) charged with sturcuture XI (about 0.65 eq) and structure XIII (about 0.35 eq), n-methyl-2-pyrrolidone (NMP) (about 70 mL) was added to dissolve the solids. The solution was bubbling with nitrogen gas for about 15 min. The solution in flask (II) was subsequently transferred to flask (I) using a cannula. Another portion of degassed NMP (about 70 ml) was injected through a septum into flask (II) and then transferred to the flask (I) using the cannula. The combined solution was immersed into a heated oil bath at about 140° C. and stirred for about 24 h. Upon cooling to about 60° C., the suspension was poured into a 1M HCl methanol solution (about 600 mL) with stirring. The solids were filtered out and dried. The obtained solids were dissolved into chloroform. The organic solution was washed twice with a 1M HCl aqueous solution (about 200 mL). The combined organic phase was dried over magnesium sulfate and concentrated under vacuum before being added dropwise to methanol (about 600 mL). The precipitates were filtered and dried to give a black polymer of structure (XXV) with a yield of about 60-85%. It was observed that the polymer of structure (XXV) had surprisingly better solubility in common organic solvents such as toluene and chloroform than its fully conjugated counterpart.

Example 5: Preparation of a Conjugated Copolymer Sequence of Structure (XXVI)

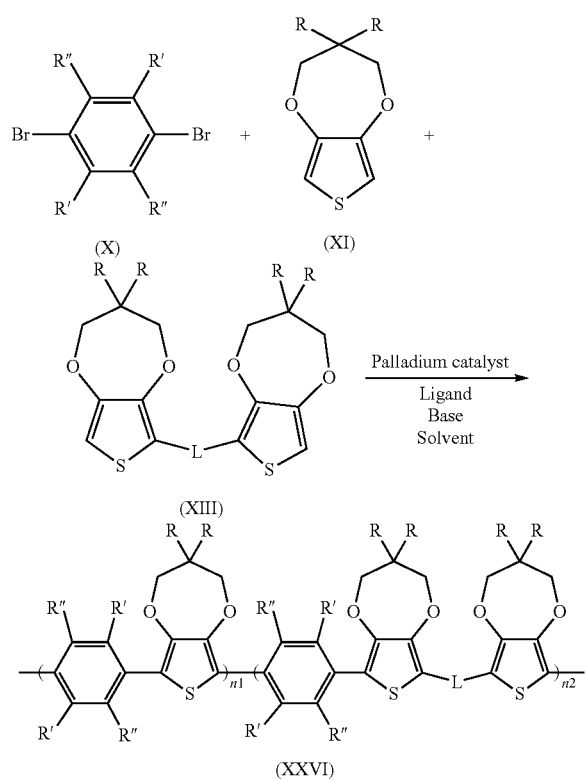

Monomer units having general structures (X), (XI) and (XIII) are combined in a suitable solvent in the presence of a palladium catalyst to form a conjugated copolymer sequence having structure (XXVI).

Each R, R', and R" in the compounds above independently corresponds to a functional group as disclosed herein. In one embodiment, each R, R', and R" is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer n1 and n2 in the compounds above is greater than zero. In one embodiment, integers n1 and n2 each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

Example 6: Preparation of a Conjugated Copolymer Sequence of Structure (XXVII)

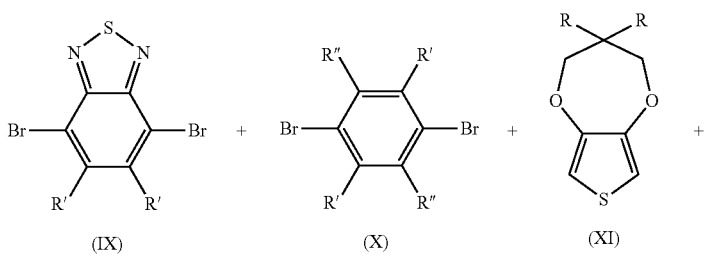

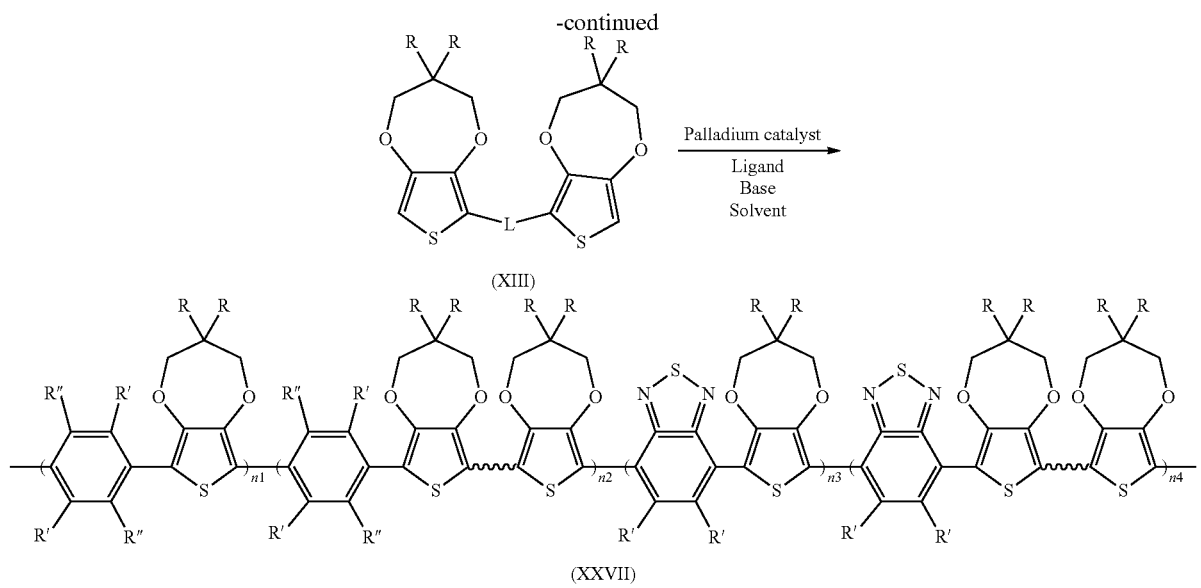

(XIII)

(XXVII)

Monomer units having general structures (IX), (X), (XI) and (XIII) are combined in a suitable solvent in the presence of a palladium catalyst to form a conjugated copolymer sequence having structure (XXVII).

Each R, R', and R" in the compounds above independently corresponds to a functional group as disclosed herein. In one embodiment, each R, R', and R" is independently selected from: $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, substituted analogs of any of the foregoing, and other such suitable functional group(s) as disclosed herein or as would be appreciated by skilled artisans upon reading the present disclosure.

Each integer n1, n2, n3 and n3 in the compounds above is greater than zero. In one embodiment, integers n1, n2, n3 and n4 each independently range from 1 to 50, 2 to 50, 3 to 50, 5 to 50, 8 to 50, 10 to 50, 15 to 50, 20 to 50, 25 to 50, 30 to 50, 35 to 50, 40 to 50, 45 to 50, 1 to 40, 2 to 40, 3 to 40, 5 to 40, 8 to 40, 10 to 40, 15 to 40, 20 to 40, 25 to 40, 30 to 40, 35 to 40, 1 to 30, 2 to 30, 3 to 30, 5 to 30, 8 to 30, 10 to 30, 15 to 30, 20 to 30, 25 to 30, 1 to 20, 2 to 20, 3 to 20, 5 to 20, 8 to 20, 10 to 20, 15 to 20, 1 to 10, 2 to 10, 3 to 10, 5 to 10, 8 to 10, 1 to 5, 2 to 5, or 3 to 5.

Applications/Uses

Embodiments of the multicolored electrochromic polymers disclosed herein may be used in various applications, devices, industries etc. For example, the multicolored electrochromic polymers may be configured for use in smart window and display technology, e.g., anti-glare car mirrors, smart windows configured to modulate the transmission or reflected solar radiation for use in cars, aircrafts, buildings, and the like; protective eyewear; camouflage and/or chameleonic materials; polymer photovoltaic devices; field effect transistors; batteries; supercapacitors; light emitting diodes; and other electrochromic and electronic devices.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for preparing at least a portion of an electrochromic polymer, the method comprising:
   combining three or more monomer units in a solvent, wherein the three or more monomer units comprise complementary reactive functional groups; and
   cross-coupling the three or more monomer units to yield a π-conjugated copolymer sequence, wherein at least two of the three or more monomer units have a structure of Formula (XI), (XII), or (XIII):

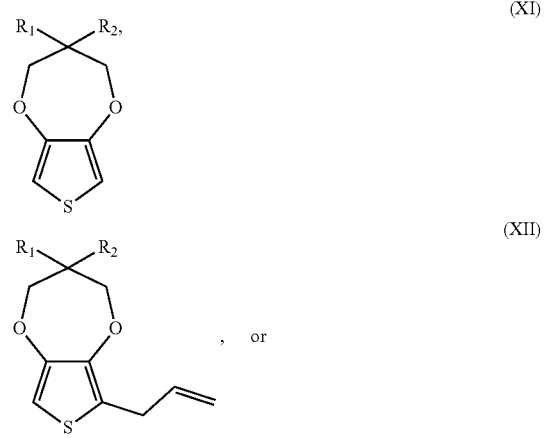

-continued

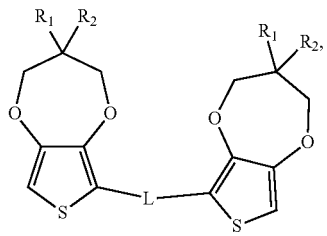

(XIII)

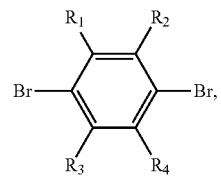

(X)

wherein:
each of $R_1$ and $R_2$ is independently selected from hdyrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing;
and L is a linking segment; and
wherein the cross-coupling further comprises separating at least two of the π-conjugated copolymer sequences by a non-conjugated flexible spacer.

2. The method of claim 1, comprising adding a catalyst to the solvent, wherein the catalyst comprises a palladium compound.

3. The method of claim 1, wherein a third of the three or more monomer units has a structure of Formula (IX) or (X):

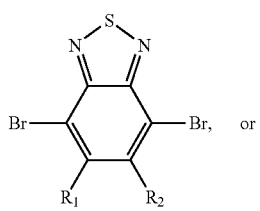

(IX)

wherein each of $R_1$, $R_2$, $R_3$, and $R_4$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing.

4. The method of claim 1, wherein the π-conjugated copolymer sequence comprises:

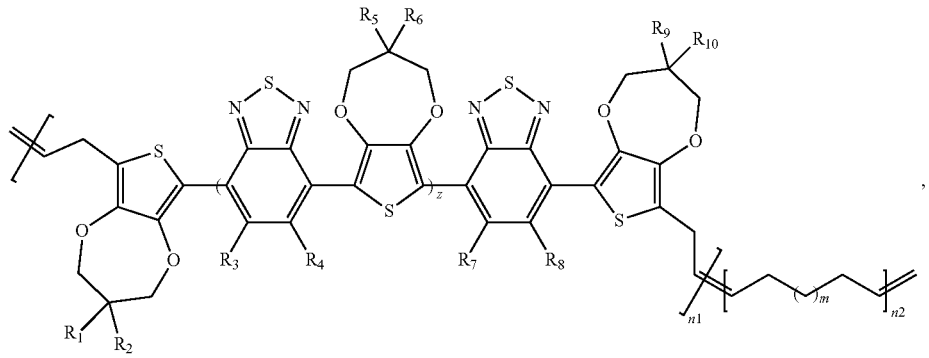

wherein:
each of z, m, n1, and n2 is independently an integer greater than 0; and
each of $R_1$, $R_2$, $R_3$, $R_4$, $R_5$, $R_6$, $R_7$, $R_8$, $R_9$, and $R_{10}$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing.

5. The method of claim 1, wherein the π-conjugated copolymer sequence comprises:

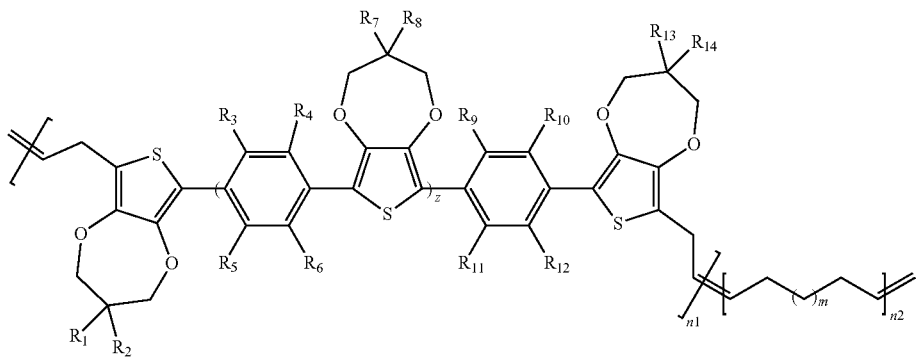

wherein:
each of z, m, n1, and n2 is independently an integer greater than 0; and
each of $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing.

6. The method of claim 1, wherein the π-conjugated copolymer sequence comprises:

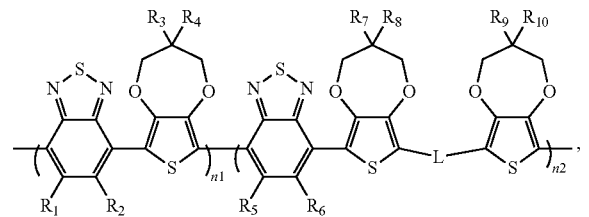

wherein:
each of n1 and n2 is independently an integer greater than 0; and
each of $R_1$, $R_2$, $R_3$, $R_4$, $R_5$, $R_6$, $R_7$, $R_8$, $R_9$, and $R_{10}$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing; and
L is a linking segment.

7. The method of claim 1, wherein the π-conjugated copolymer sequence comprises:

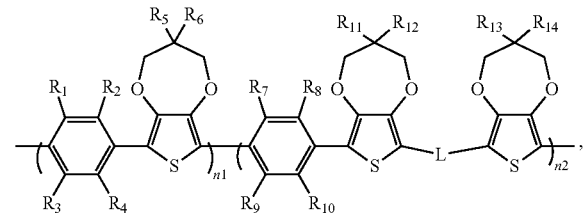

wherein:
each of n1 and n2 is independently an integer greater than 0;
each of $R_1$, $R_2$, $R_3$, $R_4$, $R_5$, $R_6$, $R_7$, $R_8$, $R_9$, $R_{10}$, $R_{11}$, $R_{12}$, $R_{13}$, and $R_{14}$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing; and
L is a linking segment.

8. The method of claim 1, wherein the π-conjugated copolymer sequence comprises:

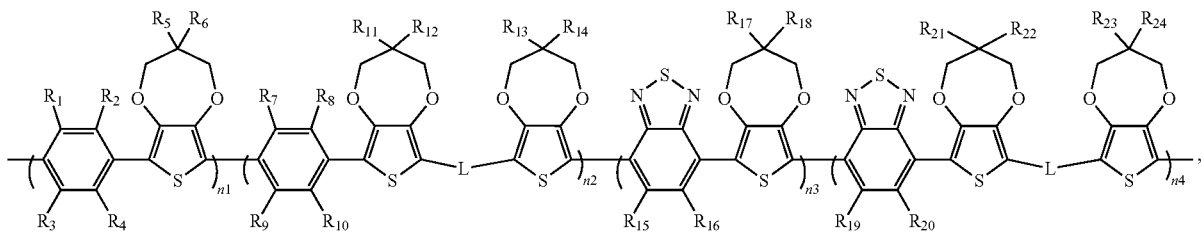

wherein:

each of n1, n2, n3, and n4 is independently an integer greater than zero;

each of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, and $R_{24}$ is independently selected from hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, $C_3$-$C_{30}$ heteroarylalkyl, and substituted analogs of any of the foregoing; and L is a linking segment.

9. The method of claim 1, wherein L comprises a non-conjugated flexible spacer.

10. The method of claim 1, wherein the non-conjugated flexible spacer comprises a terminal functional group comprising at least one of OH, NH2, COOH, phenol, or alkene.

11. The method of claim 1, wherein the combining of the three or more monomer units comprises forming a terminal alkene using a palladium catalyst.

* * * * *